May 28, 1968  W. B. NELLIGAN  3,385,969
NEUTRON THERMALIZATION ANALYSIS
Filed Sept. 11, 1962  2 Sheets-Sheet 1
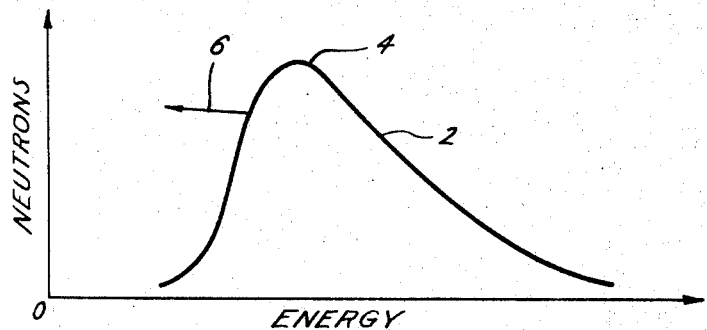
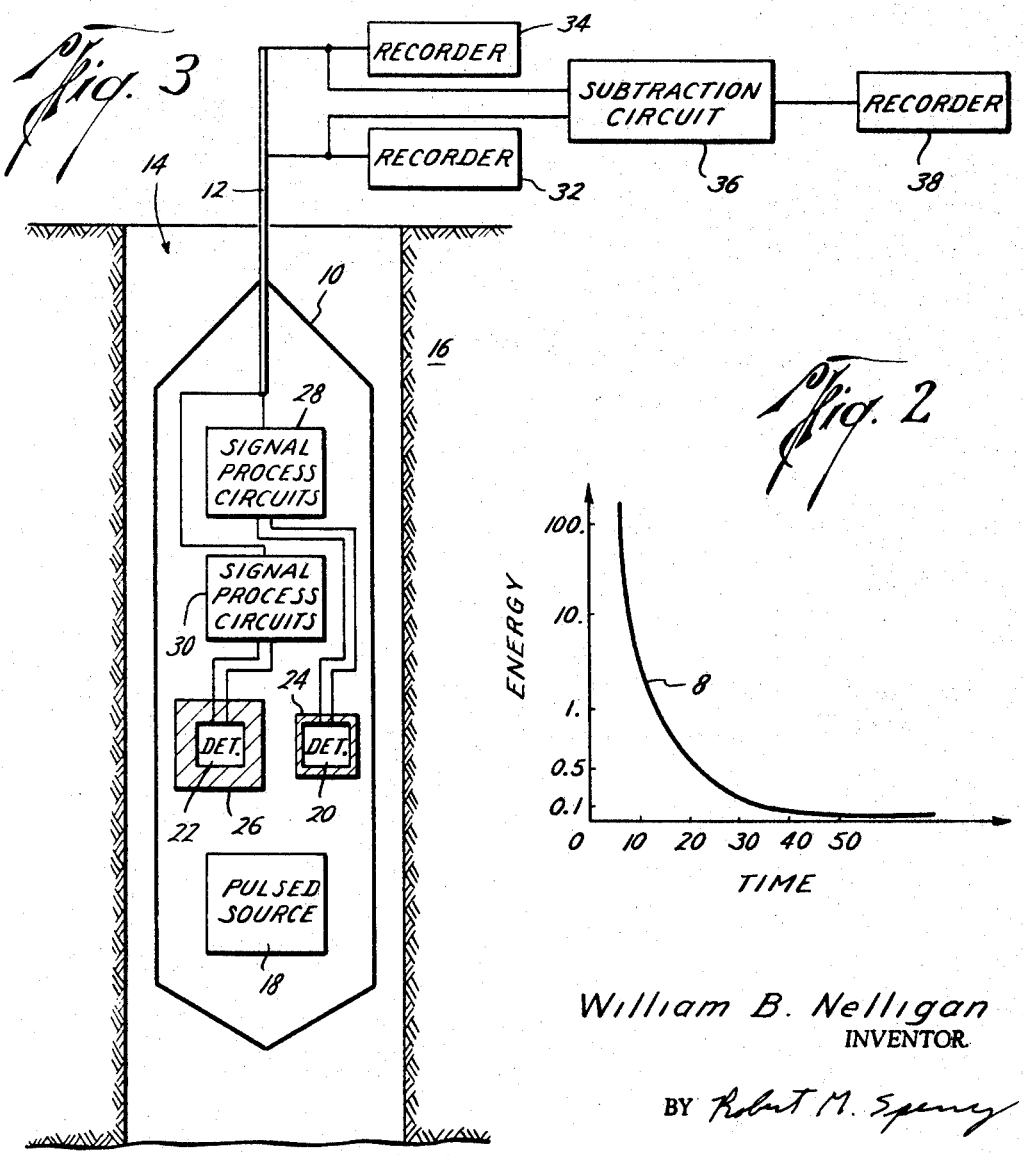
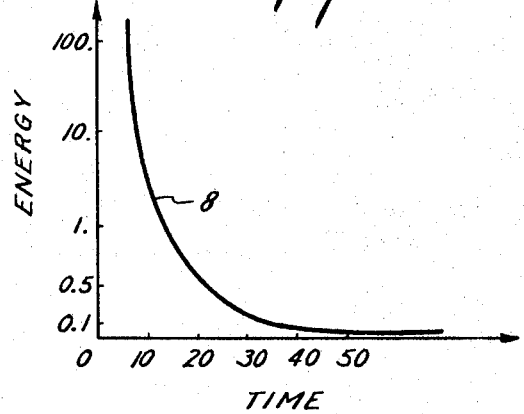
William B. Nelligan
INVENTOR.
BY Robert M. Sperry
ATTORNEY

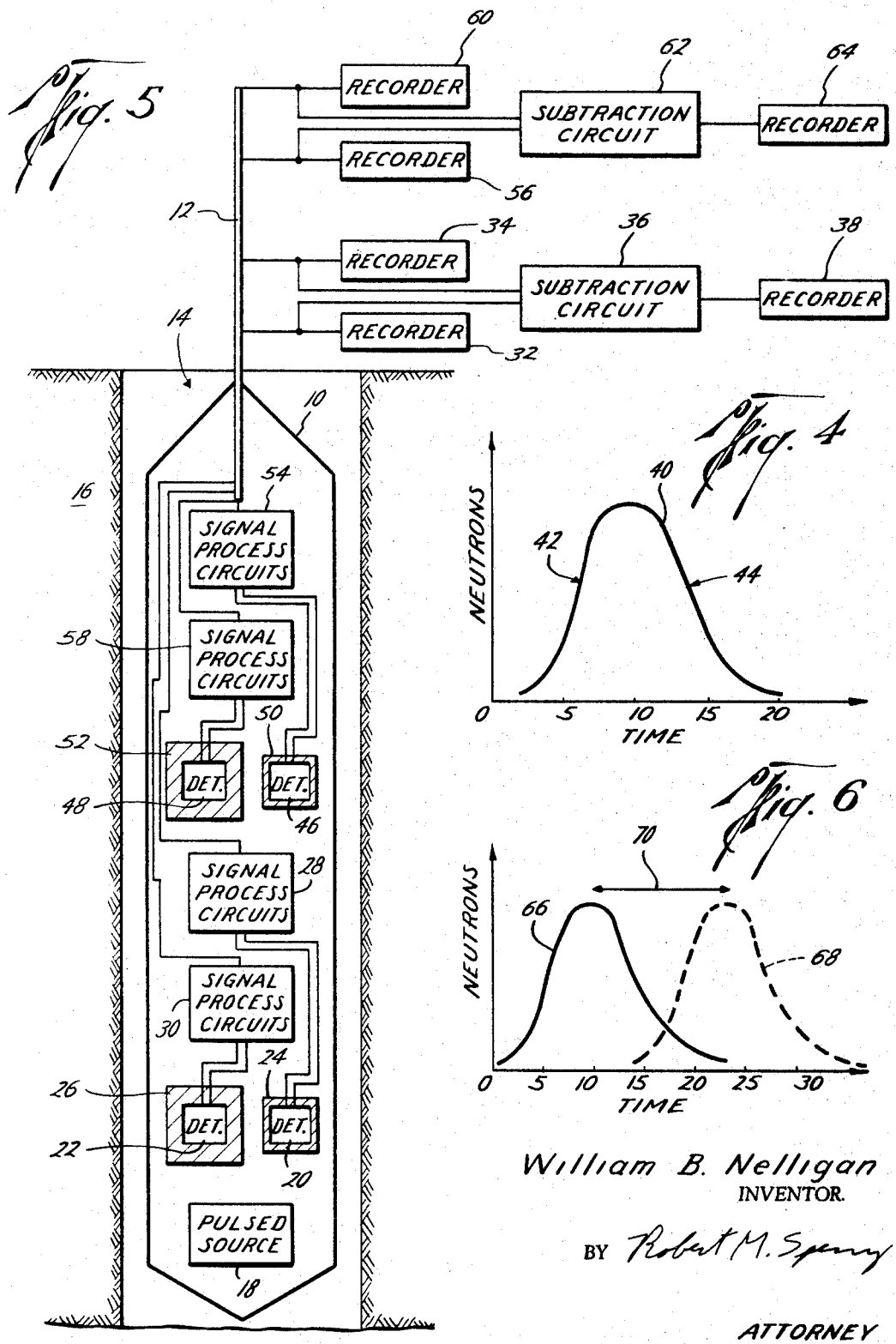

United States Patent Office 3,385,969
Patented May 28, 1968

3,385,969
NEUTRON THERMALIZATION ANALYSIS
William B. Nelligan, Danbury, Conn., assignor, by mesne assignments, to Schlumberger Technology Corporation, Houston, Tex., a corporation of Texas
Filed Sept. 11, 1962, Ser. No. 222,807
2 Claims. (Cl. 250—83.1)

This invention relates to neutron thermalization and is particularly directed to novel methods and apparatus for determining information concerning the chemical structure and composition of material by neutron thermalization analysis.

As a simplification, it may be said that, when material is irradiated with high energy neutrons, such as the 14 million-electron-volt neutrons from the deuterium-tritium reaction, each neutron is shot into the material at an extremely high velocity and undergoes rapid, repeated scattering collisions with nuclei of the atoms of the material, losing energy to the respective atoms as a result of each scattering collision. The amount of energy lost by the neutron as a result of any given scattering collision will depend upon the type of atom; that is, the element with which the neutron collides and whether the scattering collision is elastic or inelastic. As the neutron loses energy, it travels more and more slowly until, eventually, it reaches an energy, referred to as "thermal energy" wherein the energy of the neutron on the average is equal to the average energy the atoms of the material. Thereafter, the neutron drifts through the material until it is captured and becomes part of one of the atoms of the material.

When the energy of the neutron is significantly above thermal energy, one electron volt or more, the effect of such scattering collisions is essentially the same as would result from a scattering collision between a neutron and a free nucleus at rest; that is, an isolated nucleus which has no kinetic energy prior to the scattering collision. However, as the neutron slows down and its energy approaches the thermal energy of the atoms in the material, the kinetic energy of the nucleus and the energies with which the nucleus is bound to the nuclei of other atoms so as to form molecules will affect the results of the scattering collision. These energies may be equal to or greater than the energy of the incident neutron. Thus, the results of a scattering collision between a high energy neutron and a nucleus are quite different from the results of a scattering collision between a neutron near thermal energy and a nucleus.

A simplification which has been employed hereinabove is the use of the term "thermal energy" as though all of the atoms of the sample material have this particular energy. It will be understood by those skilled in the art that the value described as the thermal energy of the atoms of the material is, in reality, the average energy of the atoms of the material. This average energy increases linearly with the temperature of the material. This means that some atoms of the material will have energies greater than the average value while other atoms will have lower energies. Consequently, if a neutron having an energy approximately equal to the average thermal energy of the atoms of the material collides with one of these atoms which has a greater energy, the neutron may gain energy. This situation is clearly different from that of the simplified description of neutron interaction with matter set forth above.

It will be noted that this correction to the simplified version of neutron interaction begins to affect the results of scattering collisions as the neutron energy approaches the thermal energy of the atoms in the sample material. The onset of this phenomenon does not occur at a specific energy, but instead is gradual because of the statistical distribution of the energies of the atoms of the material. For the purpose of simplification it is convenient to assume that the nuclei of the sample material behave as free nuclei at rest for neutrons with energies greater than one electron volt, and that such neutrons always lose energy to the nuclei as a result of the scattering collisions. In contrast, for neutrons having energies less than one electron volt, the nuclei can no longer be considered as free, and the energies of the nuclei must be considered so that the neutron may actually gain energy as a result of a scattering collision. To distinguish these effects, the term "neutron moderation" is employed to refer to the process in which the neutron can be considered to interact with a free nucleus at rest. The term "neutron thermalization" is employed to refer to the process in which the neutrons approach thermal equilibrium with the nuclei of the sample material. It should be noted that the value of one electron volt is not a unique energy which determines whether a neutron undergoes the moderation process or the thermalization process. It is a convenient value to use for the purpose of making a separation mentally although physically there is no sharp boundary between the energy regions of these two types of interaction.

Numerous methods and apparatus have been proposed heretofore for determining information concerning the characteristics and composition of material by irradiating samples of the material with high energy neutrons and for detecting and analyzing the resulting gamma rays and neutrons. However, all of the prior art techniques have been based upon the neutron moderation process of neutron interaction discussed above. While these methods have been quite useful and have revealed much valuable information, the neglect of the corrections noted herein has caused much additional information to be lost or overlooked.

In accordance with the present invention, novel methods and apparatus are disclosed which take advantage of these corrections to the simplified version of neutron interaction to permit more detailed analysis of the subject material and to reveal information about the subject material which has hitherto been unobtainable.

The advantages of the present invention are attained by providing novel methods and apparatus for analyzing the effects of neutron thermalization. Thus, for example, the time and spatial distributions of neutrons resulting from neutron thermaliaztion in sample materials have been found to reveal significant information with regard to the chemical structure and composition of the sample material, and novel methods and apparatus are disclosed herein for observing and analyzing these distributions.

Accordingly, it is an object of the present invention to provide novel methods and apparatus for determining certain characteristics of a sample of material.

Another object of the present invention is to provide novel methods and apparatus for revealing information which has hitherto been unobtainable concerning a sample of material.

A further object of the present invention is to provide novel methods and apparatus for analyzing the effects of neutron thermalization in a sample of material.

A specific object of the present invention is to provide novel methods and apparatus for observing and analyzing the time and spatial distributions of neutrons resulting from neutron thermalization in a sample material.

These and other objects and features of the present invention will be apparent from the following detailed description wherein reference is made to the figures of the accompanying drawing.

In the drawing:
FIG. 1 is a curve showing the energy distribution of neutrons at a given time after emission;

FIG. 2 is a curve showing the average neutron energy as a function of time;

FIG. 3 is a diagrammatic representation of apparatus for performing the method of the present invention;

FIG. 4 is a curve which is linearly related to the probability distribution of neutrons passing through the detectors of the apparatus of FIG. 3 in a given time interval and having energies within a preselected energy range;

FIG. 5 is an alternative form of apparatus for performing the method of the present invention; and FIG. 6 is a curve showing the time distributions for arrival and departure of neutrons having energies within a preselected energy range at two spaced points.

As discussed above, the process of neutron thermalization differs from the process of neutron moderation in that the moderation process relates, effectively, to scattering collisions between high energy neutrons and free nuclei at rest; whereas, the thermalization process relates to scattering collisions between low energy neutrons and bound nuclei having binding energies of the same order of magnitude as the energies of the incident neutrons. Thus, as noted above, the thermalization process is influenced by the interatomic and intermolecular binding forces as well as by the kinetic energy of the molecule in which the nucleus is bound; whereas, the moderation process effectively is not so influenced.

It is well-known that hydrogen is extremely important as a moderating agent for neutrons. Moreover, in the petroleum industry, hydrogen is a major component of most of the materials of interest. Analysis of such materials by the neutron-moderation process has been quite useful heretofore in revealing the presence and abundance of hydrogen as a clue to the possible presence of oil. However, the neutron moderation process does not reveal the manner in which the hydrogen is present. Thus, hydrogen may be present in a gas, such as methane, a liquid, such as oil or water, or a solid, such as an oil shale or bound or hydrated water in shale or gyp. This information can be determined by the neutron thermalization process.

It has been pointed out that the neutron-thermalization process is influenced by the energies binding the nucleus. The energies of atoms which are bound in molecules are found to have discrete values which are referred to as "quantum states." The values of the quantum states of any given atom are determined by such factors as the types of the adjacent atoms to which the given atom is bound to form the molecule, the manner in which it is bound to the adjacent atoms, the manner in which the adjacent atoms are bound to the other atoms of the molecule, and the types of the other atoms of the molecule. Thus, each atom will have a plurality of possible quantum states in which it may exist.

When the atom is struck by a thermal neutron, the atom may be caused to make a transition from one of these quantum states to another. For example, the highest quantum energy states of molecules containing hydrogen correspond to stretching vibrations of the hydrogen bond with energy levels which are spaced about 0.4 electron volts apart. In water molecules the level spacing is near 0.2 electron volts corresponding to bending vibrations of this bond, but in hydrocarbon molecules these bending vibrational spacings extend to slightly less than 0.1 electron volts. Similarly, discrete quantum states exist for atoms of other elements. However, the particular levels and spacings will be different for each. Obviously, if the neutron energy is less than the energy of one of the quantum states of the molecule, that particular state cannot be excited by the neutron scattering collision.

Scattering collisions of neutrons with energies that are too low to excite states characterized by bond vibrations of individual atoms can, however, excite other states which have lower energies, such as those characterized by vibrations of groups of atoms in a molecule relative to other groups in that molecule, intermolecular vibrations, molecular rotations, and molecular translations. In these cases the nucleus behaves as if it were rigidly bound to the molecule and the neutron effectively collides with the entire molecule. This phenomenon is characterized by a decrease in the average energy loss of the neutron per collision and an increase in the probability of collision. The probability of collision per unit path length divided by the number of nuclei per unit volume is referred to as the "collision cross section" for the nuclei of the element in question.

It is clear that the magnitudes of the energy loss per collision and the collision probability depend on the types of molecules in the material and not solely on the atomic composition. Furthermore, the state of the material (gas, liquid, or solid) will influence the above quantities because of the relationships between intermolecular forces and the state of the material. It should be emphasized that the energy loss per collision is a statistical quantity even when the state of the system with which it collides is known.

Since these changes are characteristic and can be measured, the analysis of the measurements allows determination of both the chemical composition and the chemical structure of the sample material. Thus, where analysis of the neutron-moderation process might show that hydrogen was present, analysis of the neutron thermalization process would indicate whether the hydrogen was present as oil, water, methane, or oil shale.

The direct measurement of the neutron energy change in each interaction is obviated in the present invention since it is possible to obtain information concerning these changes in a relatively simple manner.

Under the simplified version of neutron interaction, discussed above, if a sample of material is irradiated with a short burst of neutrons at a given energy, the neutrons will penetrate the material and will lose energy as a result of scattering collisions with the atoms of the material. However, as the neutrons travel through the sample material, they will not all follow one path and, furthermore, will lose different amounts of energy as a result of their respective collisions. Thus, at any given time after the end of the irradiation period, there will be some neutrons which have lost more energy than others. However, it is possible to draw a curve showing the energy distribution of the neutrons at such a time. A typical energy distribution curve for such a time is shown at 2 in FIG. 1. At any later time, the shape of the curve will be essentially the same, but the position of the peak 4 as well as the mean energy will be displaced to a lower energy, as indicated by arrow 6. Thus, if the curve 2 were plotted for all times after the end of the irradiation period, the curve 2 would be seen to gradually move to the left toward the equilibrium position.

As discussed above, when the neutron energy is large compared to the binding forces on the nuclei, the neutrons lose energy by the neutron moderation process and the average loss of energy per collision is relatively great. Thus, the neutrons lose energy rapidly because of this effect and because the time between collisions is shorter. However, as the energy of the neutrons falls, the binding energies become more significant, and after the neutrons fall below an energy value of the order of magnitude of the highest populated equilibrium states of protons in the material (about one electron volt), the neutron thermalization process begins to take effect. As stated above, the change in neutron energy as a result of scattering collisions during thermalization is quite small and, in some instances, may result in a gain of energy for the neutron, rather than a loss. In view of this and the greater time between collisions of low-energy neutrons, the time required for the neutron energy to decay below one electron volt will usually be very long compared to the time required for the neutron energy to decay from its initial energy to one electron volt. In fact, where the sample material is irradiated with neutrons having initial energies of 14 million electron volts, the time required for the neutron energy to decay to one electron volt is less than one-half the time required for the neutron energy to decay from one electron volt to 0.1 electron volt. This is indicated by curve 8 in FIG. 2.

It should be noted that in measuring neutron interactions, whether during moderation or thermalization, the factors of interest are the amount of energy lost per collision and the scattering collision cross section since they strongly influence the number of neutrons present having a particular energy at a particular time. In accordance with the present invention, these effects can be determined by measuring the time required for the average neutron energy to decay through one or more preselected energy bands within the thermalization region. This may be accomplished with the apparatus of FIG. 3.

FIG. 3 discloses apparatus for accomplishing the method of the present invention in a borehole. As shown, the apparatus includes a subsurface instrument 10 suspended by means of a cable 12 in a borehole 14 which penetrates earth formation 16. The cable 12 may be wound onto or off a suitable winch, not shown, in a conventional manner to traverse the instrument through the borehole. In addition, the cable 12 serves to transmit electrical signals between the subsurface instrument 10 and the surface equipment in a conventional manner. Within the subsurface instrument 10, a pulsed source 18 of high energy neutrons is provided to irradiate the sample material; in this case, the earth formations 16, with periodic bursts of neutrons having energies above the thermal level, such bursts having durations of about one microsecond at intervals of about 1000 microseconds. Several sources of this type are available and generally emit neutrons having energies of 14 million electron volts. Typical of such sources is that disclosed by Clark Goodman in his copending application, Ser. No. 275,932, filed Mar. 11, 1952, now abandoned in favor of Ser. No. 648,170, filed June 22, 1967, and assigned to the assignee of the instant application. A pair of neutron detectors 20 and 22, of the type which establishes electrical signals in response to detection of incident neutrons, are positioned approximately equal distances from the source 18 and are arranged to detect neutrons emerging from the earth 16.

Preferably, the detectors 20 and 22 are sensitive to neutron density. However, since neutron density is functionally related to the neutron flux, detectors which are sensitive to the neutron flux may be employed. In addition, the detector 20 is surrounded by suitable shielding material 24, such as cadmium, having sufficient thickness to block neutrons having energies below the upper limit of the preselected energy band. Similarly, detector 22 is surrounded with shielding material 26 having sufficient thickness to block neutrons having energies below the lower limit of the preselected energy band. If desired, detectors 20 and 22 may be gated off while source 18 is emitting neutrons. The outputs of the detectors 20 and 22 are passed through suitable signal-processing circuits 28 and 30, and are transmitted over cable 12 to suitable recorders 32 and 34, respectively, where the signals are recorded as a function of time after the burst of neutrons from source 18. In addition, the signals from signal-processing circuits 28 and 30 are preferably passed to a subtraction circuit 36 which subtracts the output of detector 22 from that of detector 20 and supplies the difference to a suitable recorder 38 which records the signals as a function of time after the burst. This difference will represent the time distribution of those neutrons having energies within the preselected energy band. The signal-processing circuits 28 and 30 are conventional and will be well understood by those versed in the art. Typically, the signal-processing circuits 28 and 30 would include such circuits as amplifiers, scalers, blocking oscillators and the like.

With the apparatus of FIG. 3, the recorder 38 will provide a curve similar to that indicated by curve 40 of FIG. 4 which is linearly related to the probability distribution of neutrons passing through the detectors 20 and 22 in a given time interval and having energies within the preselected energy band. As stated above, source 18 irradiates the earth 16 with short bursts of neutrons having 14 million-electron-volts energy, whereas, detectors 20 and 22 are shielded to observe only neutrons having energies within a preselected portion of the thermalization region; for example, neutrons having energies less than 0.15 electron volt and greater than 0.05 electron volt. Thus, during and immediately after the irradiation period essentially no neutrons will be seen by the detectors 20 and 22, as practically all of the neutrons will be at high energies where the detectors 20 and 22 are relatively insensitive. Moreover, since shielding materials 24 and 26 are not effective at these energies, the counting rates from detectors 20 and 22 will be identical for these neutrons so that the effects of these neutrons will be cancelled by the subtraction circuit 36. However, after a short delay, of the order of 3 microseconds, many of the neutrons will have decayed to energies approaching the upper limit of the preselected energy band provided by detector 20. Consequently, the signal on recorder 38 will rise sharply to a maximum during the next few microseconds, as indicated at 42 in FIG. 4, due to the neutrons entering the preselected energy range. Thereafter, the neutrons will undergo interactions within the preselected energy range for several microseconds and, eventually, will decay to energies below the lower limit of the preselected energy band provided by detector 22. Consequently, the signal on recorder 38 will fall, as indicated at 44 in FIG. 4. The slope of curve 40 in the region 44 will indicate the rate at which the neutrons are leaving the preselected energy band. From the curve of FIG. 4 it is possible to determine the average rate of energy loss for neutrons decaying to and through the preselected energy band. If the hydrogen content of the formations is known—and this may be determined by various methods, such as that disclosed in Pat. No. 2,991,364, issued July 4, 1961, to Goodman and assigned to the present assignee—the rate of energy loss, indicated by the curve of FIG. 4, will be a function of structure of the molecules in which the hydrogen atoms are bound and the manner in which these molecules are present in the sample material; in this instance, the earth formation 16. Where the hydrogen content is unknown, it can be determined by performing similar measurement at an energy band near 1.0 electron volt simultaneously with the measurement described above. Such simultaneous measurements may be made by providing additional detectors which are suitably shielded, or by various other methods which will be apparent to those skilled in the art.

Since recorders 32 and 34 of FIG. 1 each measure the neutron flux incident on the respective detectors 20 and 22 as functions of time, it is possible to measure the time displacement between the curves of these recorders. This time displacement will be a measure of the time required for neutrons to decay through the selected energy region. Since this time is related to the energy loss per scattering collision for neutrons having energies within the selected region and to the atomic and molecular scattering cross section of the material of the formation, it is also possible to determine the molecular structure of the formation from this time displacement measurement. Here, as in the method described above, it is necessary that the hydrogen concentration of the formation be known.

It has also been found that information concerning the molecular structure of a sample of material can be obtained by determining the spatial distribution of neutrons having energies within a preselected energy band. It has been found that the neutron scattering collision cross section is directly related to the molecular structure in which the hydrogen is bound. Thus, for neutrons of given energy, a material having tightly bound atoms will, in general, have a relatively large cross section while a material having more loosely bound atoms will have a relatively small cross section. Since the cross section varies inversely with the mean free path, it will be seen that the time required for neutrons of given energy to reach two points at different distances from the source will be a function of the mean free path and, consequently, will provide an indication of the molecular structure. This may be measured by employing the apparatus of FIG. 5.

It will be seen that the apparatus of FIG. 5 is similar to that of FIG. 3. However, two additional detectors 46 and 48 have been provided and are positoned at approximately equal source to detector spacings which are substantially greater than the spacings of detectors 20 and 22. Detector 46 is provided with shielding material 50, similar to the shielding material 24 of detector 20, while detector 48 is provided with shielding material 52, similar to the shielding material 26 of detector 22. Signals from detector 46 will be passed to signal-processing circuits 54 and, thence, over cable 12 to a suitable recorder 56 where the signals will be recorded as a function of time. Similarly, the signals from detector 48 will be passed to signal-processing circuits 58, and then will be transmitted over cable 12 and recorded as a function of time by recorder 60. In addition, signals from signal-processing circuits 54 and 58 will be passed to subtraction circuit 62 and the difference will be recorded as a function of time by recorder 64. Signal-processing circuits 54 and 58 are, preferably, similar to signal-processing circuits 28 and 30 while subtraction circuit 62 is, preferably, similar to subtraction circuit 36.

With this apparatus, recorder 38 will provide a curve similar to that of FIG. 4 showing the number of neutrons having energies within the preselected energy range appearing at a first source to detector spacing as a function of time, while recorder 64 will provide a somewhat similar curve showing the number of neutrons having energies within the preselected energy range appearing at a second source to detector spacing as a function of time. A comparison of the curves provided by recorders 38 and 64 will appear substantially as shown in FIG. 6 where curve 66 represents the curve from recorder 38, and curve 68 represents the curve from recorder 64. The displacement between the curves 66 and 68, indicated by arrow 70, represents the difference in arrival time at two points which are spaced apart the distance between the two sets of detectors for neutrons in the preselected energy range. This information is indicative of the scattering collision cross section for neutrons having energies within the preselected range travelling through the earth formation 16. As indicated above, this will provide an indication of the molecular structure of the sample material which will indicate the chemical structure and composition of the sample material.

It will be apparent that numerous variations and modifications in methods and apparatus may be made without departing from the present invention. Thus, for example, several preselected energy bands could be investigated simultaneously with respect to time or spatial distribution or both. Accordingly, it should be clearly understood that the forms of the invention described above and shown in the figures of the accompanying drawings are illustrative only and are not intended to limit the scope of the invention.

I claim:
1. A method for deriving indications of the molecular composition or state of hydrogen compounds in earth formations traversed by a borehole, comprising the steps of irradiating said formations with successive bursts of relatively fast neutrons from a source in the borehole, detecting neutrons returning to the borehole at first and second points spaced at different distances therealong from said source, said neutrons being detected at each of said points intermediate such bursts with energies which are substantially solely in at least one preselected band having a lower limit slightly above the energy of thermal equilibrium and an upper limit less than 1.0 electron volt, and recording indications correlated with depth which vary in accordance with the rate at which neutrons are detected at each of said points in the preselected energy band.

2. A method for deriving indications of the molecular composition or state of hydrogen compounds in earth formations traversed by a borehole, comprising the steps of irradiating said formations with successive bursts of relatively fast neutrons from a source in the borehole, detecting neutrons returning to the borehole intermediate such bursts with energies which lie substantially solely within at least one preselected band having a lower limit slightly above the energy of thermal equilibrium and an upper limit substantially less than 1.0 electron volt, simultaneously detecting neutrons returning to the borehole intermediate such bursts with energies which lie substantially solely within a preselected energy band near 1.0 electron volt, and recording indications correlated with depth which vary in accordance with the rate at which neutrons are detected in said respective preselected energy bands.

References Cited

UNITED STATES PATENTS

| | | | |
|---|---|---|---|
| 2,920,206 | 1/1960 | Heller | 250—83.3 |
| 2,971,094 | 2/1961 | Tittle | 250—83.1 |
| 2,991,364 | 7/1961 | Goodman | 250—83.6 |
| 3,009,062 | 11/1961 | Grooksbank | 250—83.1 |
| 3,133,195 | 5/1964 | Jones | 250—83.1 |

OTHER REFERENCES

Atomic Energy Publication, GA–2113, by Wikner et al., June 16, 1961, available from the Office of Technical Services, Dept. of Commerce, Washington 25, D.C., price $2.75, pp. 83 to 128 relied on.

Marshall F. Crouch, Nuclear Science and Engineering, vol. 2, pp. 631 to 639 (1957).

ARCHIE R. BORCHELT, *Primary Examiner.*

RALPH G. NILSON, JAMES W. LAWRENCE,
*Examiners.*